United States Patent
Fajardo et al.

(10) Patent No.: US 10,880,604 B2
(45) Date of Patent: Dec. 29, 2020

(54) FILTER AND PREVENT SHARING OF VIDEOS

(71) Applicant: International Business Machines Corporation, Armonk, NY (US)

(72) Inventors: Ivonne Rocio Cuervo Fajardo, San Rafael (CR); German Ariel Zumbado Prado, Alajuela (CR); Ugo I. Orellana, Westlake Village, CA (US); Adrian Sanchez Jimenez, Heridia (CR)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 16/136,796

(22) Filed: Sep. 20, 2018

(65) Prior Publication Data

US 2020/0099982 A1    Mar. 26, 2020

(51) Int. Cl.
  H04N 21/454    (2011.01)
  H04N 21/439    (2011.01)
  G06K 9/00      (2006.01)
  H04N 21/44     (2011.01)
  H04N 21/475    (2011.01)
  G06Q 50/00     (2012.01)

(52) U.S. Cl.
  CPC ....... *H04N 21/454* (2013.01); *G06K 9/00744* (2013.01); *H04N 21/4394* (2013.01); *H04N 21/44008* (2013.01); *H04N 21/4542* (2013.01); *H04N 21/4756* (2013.01); *G06Q 50/01* (2013.01)

(58) Field of Classification Search
  None
  See application file for complete search history.

(56) References Cited

U.S. PATENT DOCUMENTS

| | | | |
|---|---|---|---|
| 8,996,538 B1* | 3/2015 | Cremer | G06F 16/70 707/749 |
| 9,396,180 B1* | 7/2016 | Salvador | H04N 21/26603 |
| 2002/0147782 A1* | 10/2002 | Dimitrova | H04N 21/4542 709/207 |
| 2009/0249387 A1* | 10/2009 | Magdy | G06F 16/7335 725/32 |
| 2011/0199535 A1* | 8/2011 | Isu | H04N 19/895 348/425.2 |

(Continued)

FOREIGN PATENT DOCUMENTS

| | | |
|---|---|---|
| CN | 102271122 | 4/2018 |
| WO | 2000045291 | 8/2000 |
| WO | 2015061699 | 4/2015 |

*Primary Examiner* — Ricky Chin
(74) *Attorney, Agent, or Firm* — VanLeeuwen & VanLeeuwen; Ingrid M. Foerster (57) ABSTRACT

An approach is provided in which an information handling system receives a request to publish a set of content data. Prior to publishing a set of content data, the information handling system evaluates a set of audio data and a set of video data included in the set of content data against a content knowledge base and generates an unsuitability ranking of the set of content data. When the unsuitability ranking exceeds a first predetermined threshold, the information handling system prohibits publication of the set of content data. When the unsuitability ranking is below a second predetermined threshold, the information handling system publishes the set of content data.

20 Claims, 6 Drawing Sheets

(56) References Cited

U.S. PATENT DOCUMENTS

| | | | | |
|---|---|---|---|---|
| 2014/0025385 A1* | 1/2014 | Atri | .................... | H04N 21/4394 |
| | | | | 704/270 |
| 2014/0052696 A1* | 2/2014 | Soroushian | .......... | H04N 21/482 |
| | | | | 707/691 |
| 2015/0082349 A1* | 3/2015 | Ishtiaq | ............... | H04N 21/4884 |
| | | | | 725/40 |
| 2016/0162576 A1* | 6/2016 | Arino de la Rubia | ....................... | |
| | | | | H04L 51/14 |
| | | | | 707/739 |
| 2016/0240223 A1* | 8/2016 | Kim | ..................... | G11B 27/031 |
| 2016/0247328 A1* | 8/2016 | Han | .................. | H04N 21/4394 |
| 2016/0372139 A1* | 12/2016 | Cho | ........................ | G10L 25/00 |
| 2017/0134406 A1* | 5/2017 | Guo | ................... | H04L 63/1416 |
| 2017/0195125 A1* | 7/2017 | Heppe | .................. | H04L 63/123 |
| 2017/0289624 A1 | 10/2017 | Avila et al. | | |
| 2018/0144194 A1 | 5/2018 | Park | | |
| 2019/0050716 A1* | 2/2019 | Barkan | ................... | G10L 25/30 |
| 2019/0073593 A1* | 3/2019 | Luo | ........................ | G06Q 10/10 |

* cited by examiner

FILTER AND PREVENT SHARING OF VIDEOS

BACKGROUND

Social media sites provide platforms for users to easily share information with other users. Some users post informative and appropriate content, while other users post inappropriate content. Perhaps the greatest challenge for a social media site to prevent unsuitable videos from being posted is simply the sheer volume of material being uploaded every second.

Companies currently do not have an automatic system in place to prevent certain types of videos from being posted. No amount of human moderators can manually review every uploaded image or video in a reasonable amount of time. In addition, the rise of live streaming brings with it new time pressures in that the video may begin and end before a human moderator even knows it has aired. As a result, companies typically wait until unsuitable videos are reported by a group of users that already viewed the video and then the company removes the video. At this point, however, millions of users may have already viewed and shared the unsuitable video.

BRIEF SUMMARY

According to one embodiment of the present disclosure, an approach is provided in which an information handling system receives a request to publish a set of content data. Prior to publishing a set of content data, the information handling system evaluates a set of audio data and a set of video data included in the set of content data against a content knowledge base and generates an unsuitability ranking of the set of content data. When the unsuitability ranking exceeds a first predetermined threshold, the information handling system prohibits publication of the set of content data. When the unsuitability ranking is below a second predetermined threshold, the information handling system publishes the set of content data.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
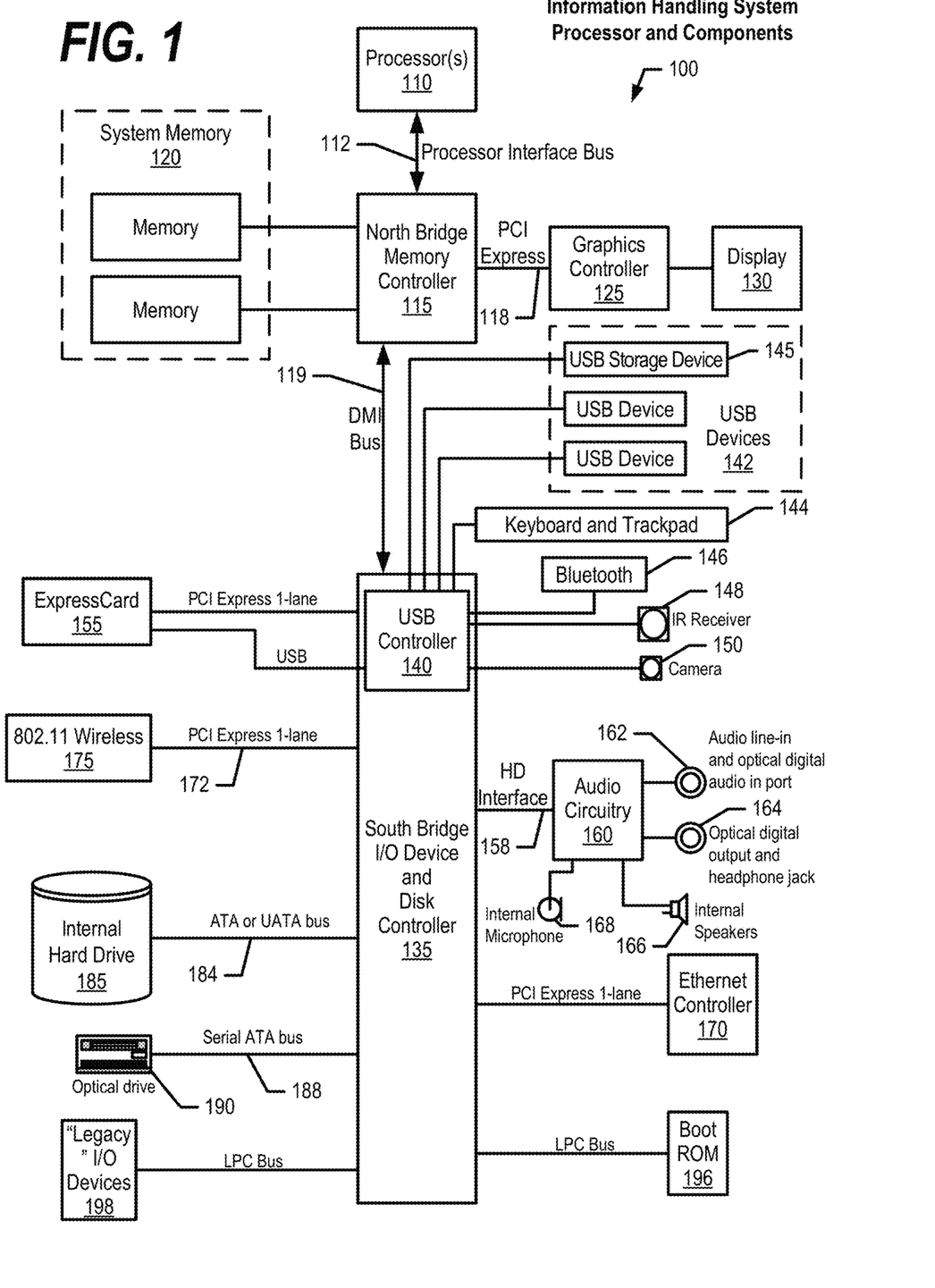
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
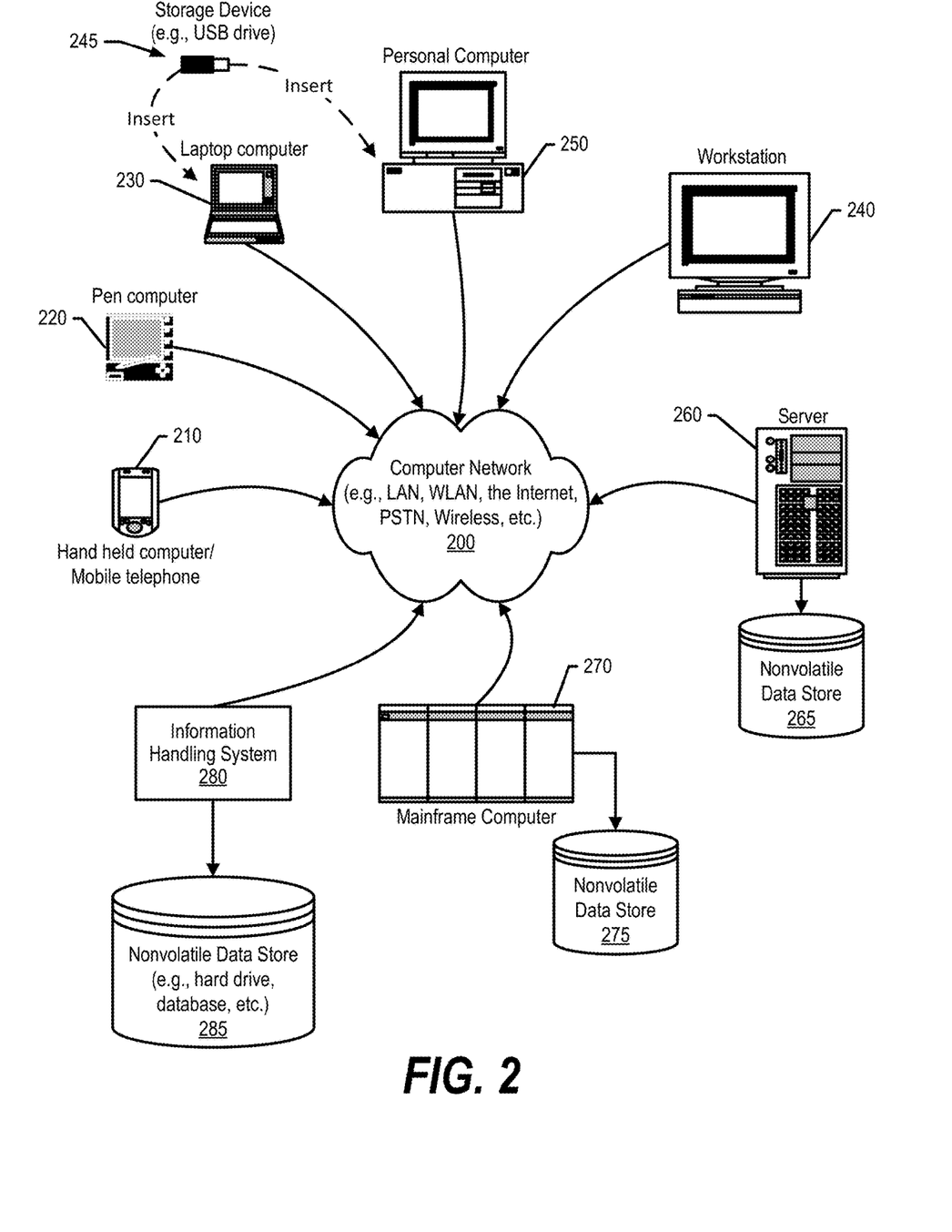
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, companies typically wait until unsuitable videos are reported by a group of users that already viewed the unsuitable video before the company removes the video from their social media site. FIGS. 3 through 6 depict an approach implemented on an information handling system that evaluates content data (sound, image, dialogue, etc.) prior to publication and generates an unsuitability ranking based on the evaluated content. As defined herein, the unsuitability ranking indicates whether the evaluated content should be provided to underage audiences. The information handling system then publishes the video, prohibits publication of the video, or passes the video to an evaluator for further review based on the unsuitability ranking. As a result, the approach discussed herein minimizes unsuitable videos from being published on social media sites.

Figure 3:
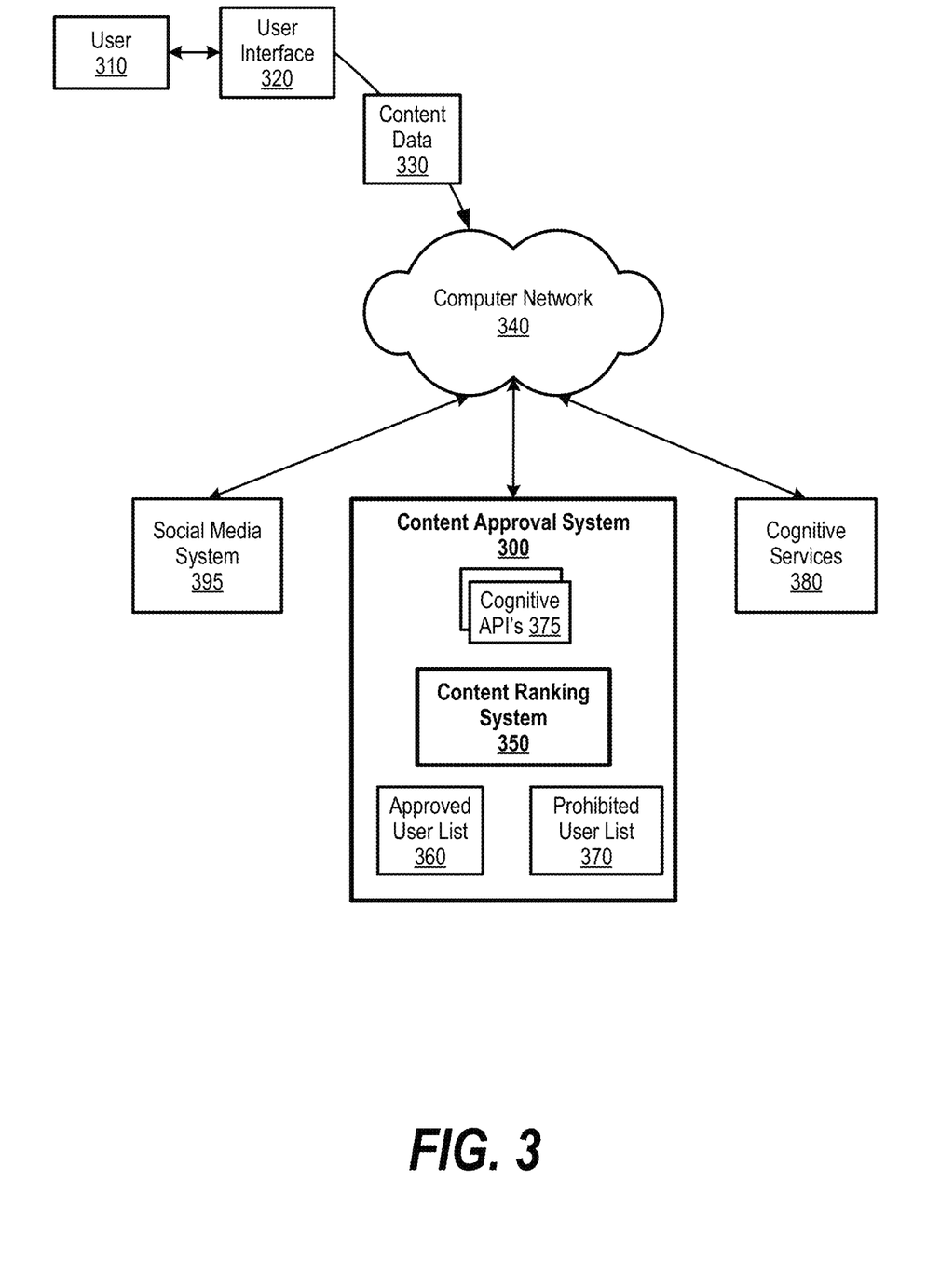
FIG. 3 is an exemplary diagram depicting a content approval system that ranks a set of content data based on unsuitability and publishes the set of content data, prohibits the publication of the content data, or sends the set of content data to an evaluator for further evaluation.

FIG. 3 is an exemplary diagram depicting a content approval system that ranks a set of content data based on unsuitability and publishes the set of content data, prohibits the publication of the content data, or sends the set of content data to an evaluator for further evaluation.

Content approval system 300 receives a request to publish content data 330 from user 310 via user interface 320 through computer network 340. Content approval system 300 compares user 310 against approved user list 360 and prohibited user list 370 to determine whether the user is "pre-approved" or "pre-prohibited" to/from publishing content. In one embodiment, content approval system 300 tracks historical content data from various users and, after a certain number of publications or prohibited publications, content approval system 300 adds the user to approved user list 360 or prohibited user list 370, respectively (see FIG. 6 and corresponding text for further details). In another embodiment, content approval system 300 stores a list of authorized users in approved user list 360 that are assigned to post corporate videos.

When user 310 is not in approved user list 360 or prohibited user list 370, content approval system 300, content approval system 300 uses cognitive APIs 375 as an interface to cognitive services 380 to evaluate the set of content. In one embodiment, content approval system 300 parses content data 330 into audio data and video data, and sends the audio data to a cognitive audio service 380 through a cognitive audio API 375 for evaluation, and sends the video data to a cognitive video service 380 through a cognitive video API 375. In one embodiment, a cognitive audio service 380 evaluates both sound (e.g., screams) as well as speech (dialog). In another embodiment, cognitive services 380 include separate services for sound and speech (see FIG. 5 and corresponding text for further details).

Figure 5:
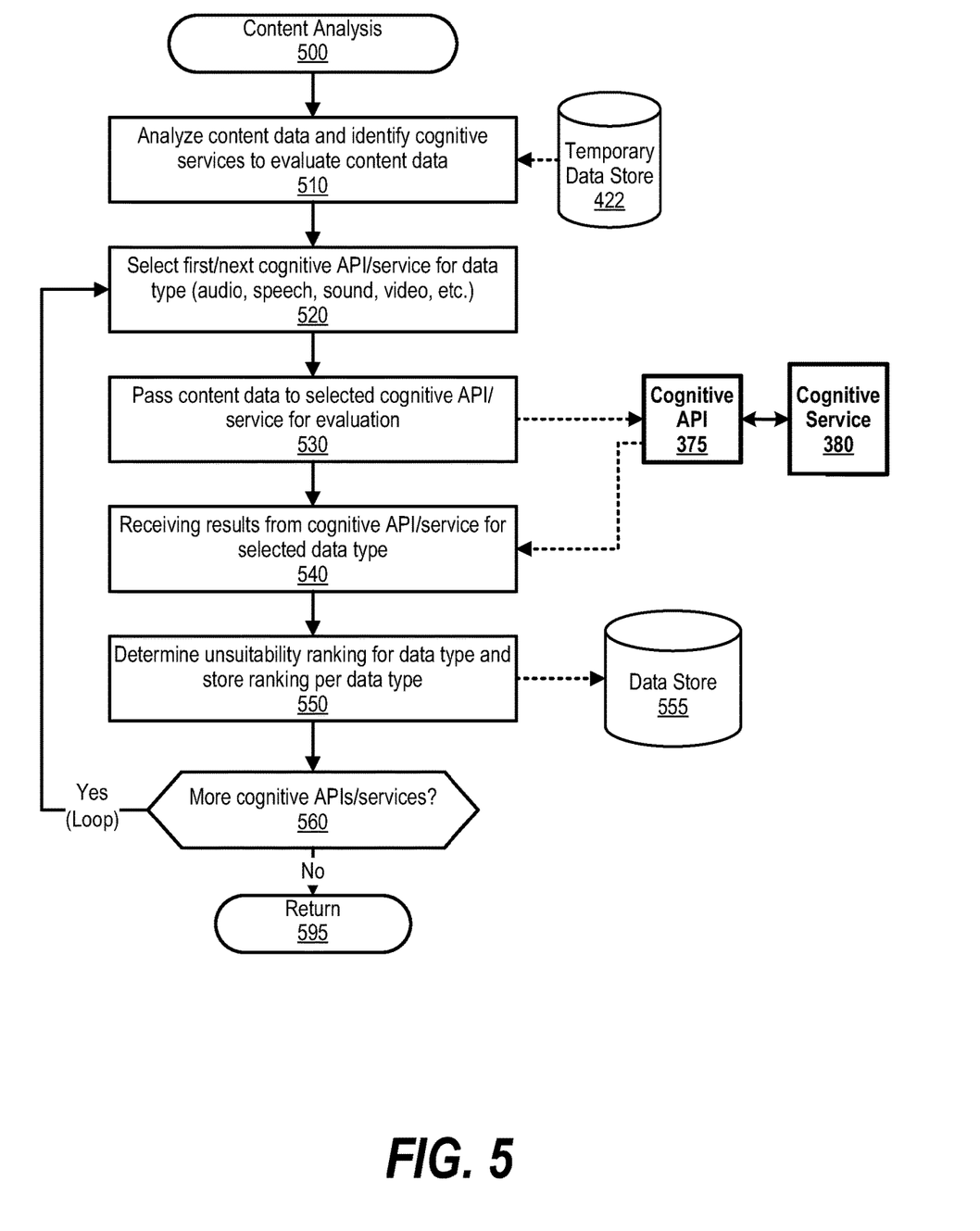
FIG. 5 is an exemplary flowchart showing steps taken to analyze and rank individual content types of content data.
Figure 6:
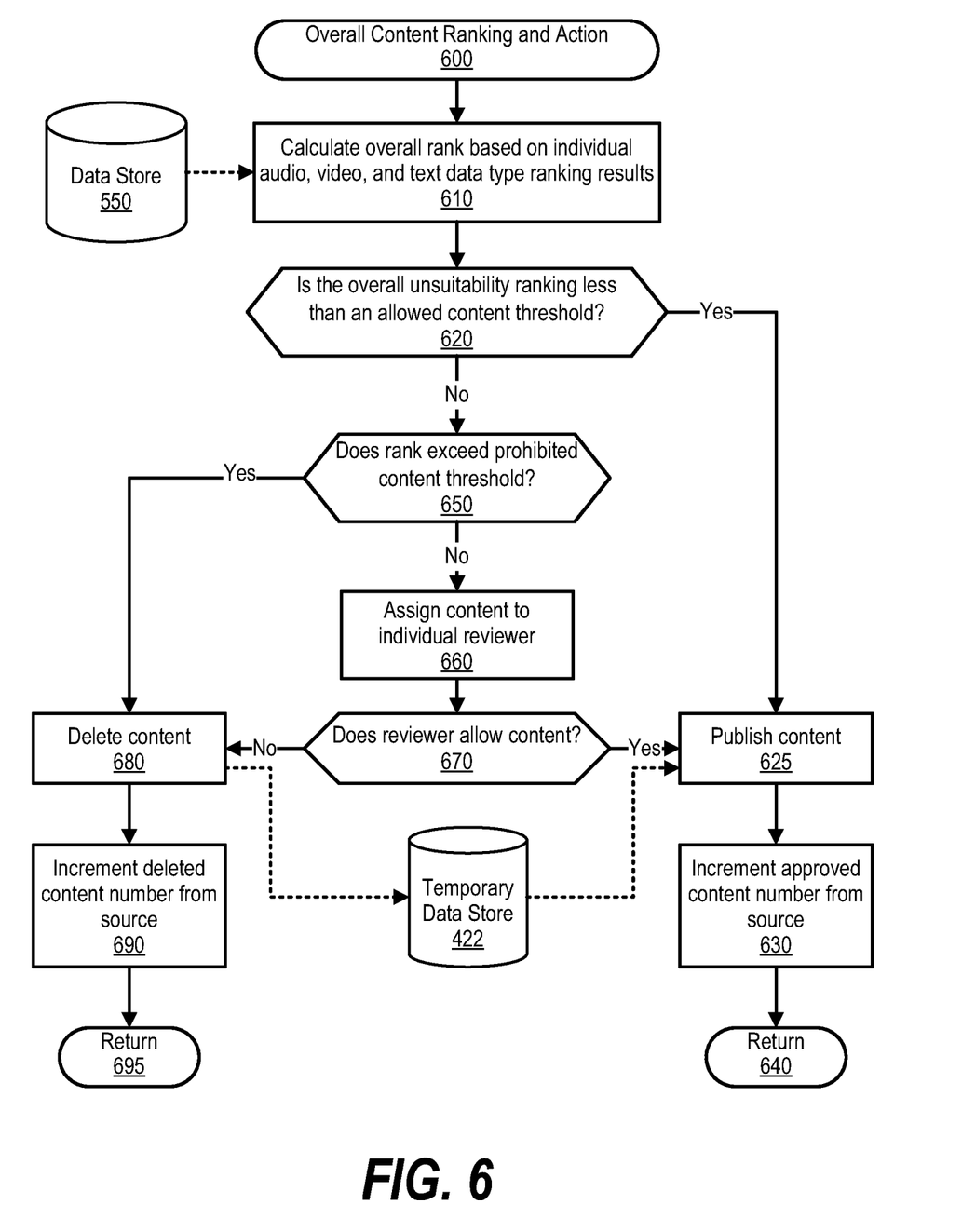
FIG. 6 is an exemplary flowchart showing steps taken to determine an overall unsuitability ranking for a set of content data and perform actions accordingly.

Content approval system 300 receives audio rankings and video rankings from cognitive systems 380 based on certain criteria and uses content ranking system 350 to evaluate the received rankings and generate an overall unsuitability ranking (see FIGS. 5, 6, and corresponding text for further details). Based on the overall unsuitability ranking, content approval system 1) publishes the content data on social media system 395, 2) prohibits publication, or 3) sends the content data to an evaluator for further evaluation (see FIG. 6 and corresponding text for further details).

Figure 4:
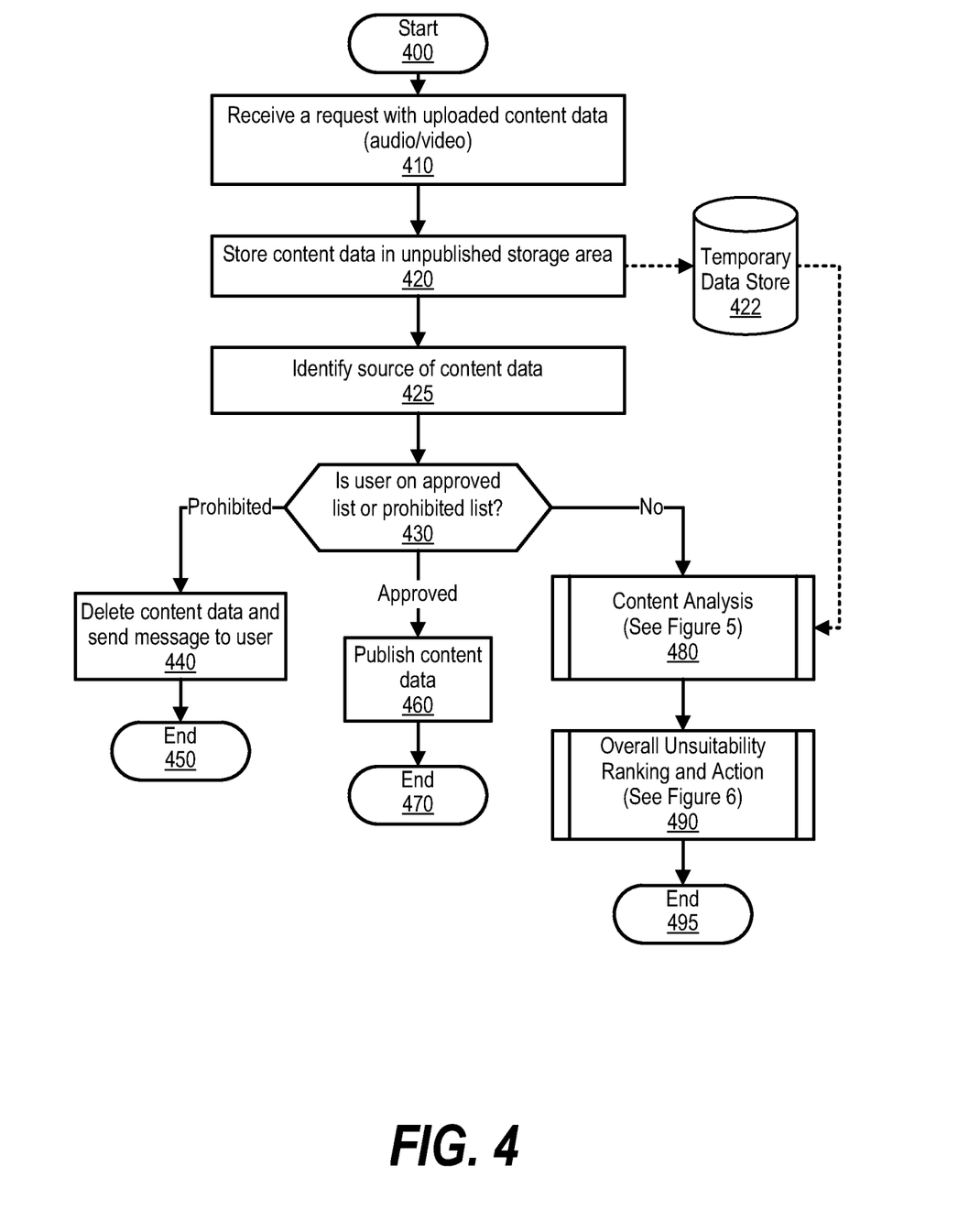
FIG. 4 is an exemplary high-level flowchart showing steps taken to evaluate a set of content data and take appropriate action based on whether the content data includes a substantial amount of unsuitable activity.

FIG. 4 is an exemplary high-level flowchart showing steps taken to evaluate a set of content data and take appropriate action based on whether the content data includes a substantial amount of unsuitable activity. FIG. 4 processing commences at 400 whereupon, at step 410, the process receives a request with uploaded content data (audio/video), such as a request to publish a video on a social media site.

At step 420, the process stores the content data in an unpublished temporary storage area 422 and, at step 425, the process identifies the source of content data (e.g., user ID). The process determines as to whether the source is on an approved user list or prohibited user list (decision 430). For example, the user belongs to a well-respected company and the user has published several company related videos. If the source is on the approved user list, then decision 430 branches to the 'Approved' branch whereupon, at step 460, the process publishes the content data and FIG. 4 processing thereafter ends at 470.

On the other hand, if the user is on the prohibited user list, decision 430 branches to the 'Prohibited' branch whereupon the process deletes the set of content data and sends a message to the user at step 440 to not send more requests to publish content. For example, the user has attempted to publish several unsuitable videos in the past and is prohibited from publishing any further content. FIG. 4 processing thereafter ends at 450.

Yet on the other hand, if the user is not on the approved user list or the prohibited user list, decision 430 branches to the 'No' branch. At predefined process 480, the process analyzes the set of content data in temporary data store 422, which includes analyzing its audio and video content using cognitive services 380 (see FIG. 5 and corresponding text for processing details). At predefined process 490, the process computes an overall unsuitability ranking based on the analysis performed in step 480 and performs an action accordingly, such as prohibiting the publication of the content data, publishing the content data, or sending the content data to an evaluator for further review (see FIG. 6 and corresponding text for processing details). FIG. 4 processing thereafter ends at 495.

FIG. 5 is an exemplary flowchart showing steps taken to analyze and rank individual content types of content data. FIG. 5 processing commences at 500 whereupon, at step 510, the process analyzes the content data in temporary data store 422 and identifies cognitive APIs/services to analyze and rank the content data on a per data type basis (e.g., speech, sound, video, etc.). In one embodiment, the process sends the set of content data to cognitive services 380 through cognitive APIs 375 and has cognitive services 380 determine which services to utilize for the evaluation.

At step 520, the process selects the first cognitive API/service for a particular data type and, at step 530, the process passes the content data to the selected cognitive service 380 through cognitive API 375 for analysis and processing. Cognitive service 380 analyzes the content data and returns results that, in one embodiment, include a category type and percentage value. For example, during sound/audio analysis, when cognitive service 380 recognizes a scream, cognitive service 380 differentiates a real life scream from an acting scream. Cognitive service 380 retrieves different categories of screaming audio from, in one embodiment, a content knowledge database to compare against the scream in the content data, such as a positive scream category, frightened scream category, acting scream category, etc. Cognitive service 380 compares the audio against real-life screams and acting screams based on stress, anger, frustration levels, breathing levels, etc.

After comparing the identified audio with the real life and acting screams and assigning initial percentages, cognitive service 380 analyzes and identifies, with a percentage of degree, whether the scream is acted or real life. If the acted scream category percentage is higher than the real life scream category, cognitive service 380 ranks the audio content accordingly. However, if the real life scream category percentage is higher, then cognitive service 380 compares the scream to a knowledge database of real-life scream tones. In one embodiment, cognitive service 380 retrieves and compares the audio with different categories of emotion of real life screams stored on the knowledge database (pain, happiness, sadness, despair, etc.). Once compared, cognitive service 380 assigns similarity percentages to the various categories of emotion and provides the similarity percentages to the process at step 540.

The process, at step 550, determines an unsuitability ranking for the selected data type based on the received categories and percentages, and stores the unsuitability ranking in data store 555. For example, if a positive category scream percentage of likeliness is between 80% and 99.99% (e.g., happiness, such as a shout of Goal!) then the process ranks the scream as a 1. If a neutral category scream percentage of likeliness is between 60% and 89.99% (e.g., shouting directions to a crowd) then the process ranks the scream as 2. If an unsuitable category scream percentage of likeliness is between 69.99% and 89.99% (e.g., scream of pain) then the process ranks the scream as 3 or 4 (if the audio is similar to a compared scream from the knowledge database).

In one embodiment, the process fetches cognitive APIs such as Natural Language Understanding, Alchemy Language, Personality Insights, etc. to identify context of the dialog and provide a percentage value base on the categories of context from the knowledge database to proceed and rank the content. In this embodiment, the process provides a percentage of likeliness to the evaluated dialog with each of the categories and provides a rank value. For example, if the percentage of likeliness is between 69.99% and 94.99% for a car accident dialog then the process ranks the dialog as 3. If the percentage of likeliness is between 69.99% and 94.99% for a crime scene or terrorism (e.g., one person dialog mentioning social or religious justifications), and dialogs from the knowledge database are similar to the compared dialog, then the process ranks the scene as 4.

The process determines as to whether there are more cognitive APIs/services to utilize (decision 560). If there are more cognitive APSs/services to utilize, decision 560 branches to the "Yes" loop, which loops back to fetch a different cognitive API/service. In one embodiment, regarding video content, the process identifies video content and fetches a cognitive visual recognition API to understand the contents of images of the scenes of the video. In this embodiment, the cognitive API analyzes images for scenes, objects, faces, colors, and other subjects that provide insights into the visual content. The visual content identified is compared against the combinations of images and content categories on the knowledge database to set a percentage of likeliness. In this embodiment, cognitive service 380 provides a percentage of likeliness to the evaluated visual content with each content category and provides a rank value. If the images of the scenes identified have percentage of likeliness between 89.99% and 99.99% the rank is close to 10, but if the image of likeliness is between 49.99% and 69.99% the rank is close to 3. Then the process combines the percentage of likeliness for each image to determine a video ranking.

This looping continues until there are no more cognitive APIs/services to fetch, at which point decision 560 branches to the 'No' branch whereupon FIG. 5 processing thereafter returns to the calling routine (see FIG. 4) at 595.

FIG. 6 is an exemplary flowchart showing steps taken to determine an overall unsuitability ranking for a set of content data and perform actions accordingly. FIG. 6 processing commences at 600 whereupon, at step 610, the process calculates an overall unsuitability ranking based on individual audio ranking (sound, dialog) and video ranking results. In one embodiment, the process applies a formula to obtain the average ranking of the content data. In this embodiment, on a scale from 1-4, because individual rankings between 3 and 4 have a higher probability to have unsuitable content, those variables are weight as double. For example, if the sound data type was ranked as 2, the dialog data type was ranked as 1, and the video data type was ranked as 3, the video images data type is weighed as double. As such, the overall ranking is 2(1)+1(1)+3(2)/3=3.

The process determines as to whether the overall unsuitability ranking is below a predetermined allowed content threshold, such as a value less than 3 (decision 620). If the overall unsuitability ranking is less than the allowed content threshold, then decision 620 branches to the 'Yes' branch whereupon the process publishes the content data at step 625 and increments the approved content number corresponding to the source (user) for future evaluation of approved user lists (step 630). In one embodiment, the process stores the content data with corresponding descriptions for each of the sections identified in the knowledge database for future references.

However, if the overall unsuitability ranking is not lower than the allowed content threshold, decision 620 branches to the 'No' branch. The process determines as to whether the overall unsuitability ranking exceeds a predetermined prohibited content threshold, such as 3.5 (decision 650). If the overall ranking exceeds the prohibited content threshold, then decision 650 branches to the 'yes' branch whereupon, at step 680, the process deletes the content from temporary data store 422 and, at step 690, the process increments the deleted content number corresponding to the source. FIG. 6 processing thereafter returns to the calling routine (see FIG. 4) at 695.

On the other hand, if the overall unsuitability ranking does not exceed the prohibited content threshold, then decision 650 branches to the 'no' branch. At step 660, the process assigns the content data to an individual reviewer to evaluate the content data. In one embodiment, the process sends two messages, one to the source user indicating that the video content is under evaluation, and another message to the reviewer with a link to the file indicating that a video with a high probability of unsuitable content requires to be reviewed.

The process determines as to whether the reviewer allows the content to be published (decision 670). If the reviewer allows the content to be published, then decision 670 branches to the 'yes' branch to perform steps to publish the content. On the other hand, if the reviewer does not allow the content to be published, then decision 670 branches to the 'no' branch to prohibit the content from being published.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   receiving a request from a user to publish a set of content data;
   prior to publishing the received set of content data:
   generating an unsuitability ranking of the set of content data in response to evaluating a set of audio data and a set of video data included in the set of content data against a content knowledge base, wherein the evaluating further comprises: in response to determining that the set of audio corresponds to an acting scene, assigning a set of category similarity percentages to the set of audio data based on analyzing the set of audio data against a first set of emotion category audio;
   in response to determining that the set of audio fails to correspond to the acting scene, assigning the set of category similarity percentages to the set of audio data based on analyzing the set of audio data against a second set of emotion category audio; and generating the unsuitability ranking based on the set of category similarity percentages;

in response to the unsuitability ranking exceeding a first predetermined threshold, prohibiting the publication of the set of content data; and in response to the unsuitability ranking being below a second predetermined threshold, publishing the set of content data.

2. The method of claim 1 further comprising:
storing the content data in an unpublished storage area in response to receiving the request from the user; and
performing the evaluating while the content data is stored in the unpublished storage area.

3. The method of claim 1 further comprising:
automatically publishing the content data in response to determining that the user belongs to an approved user list.

4. The method of claim 1 further comprising:
automatically prohibiting the publication of the content data in response to determining that the user belongs to a prohibited user list.

5. The method of claim 1 further comprising:
submitting the content data to an evaluator for review in response to determining that the unsuitability ranking is in a range between the first predetermined threshold and the second predetermined threshold.

6. The method of claim 1 wherein the evaluating further comprises:
sending the audio data to a cognitive audio API;
receiving an audio unsuitability ranking from the cognitive audio API;
sending the video data to a cognitive video API;
receiving a video unsuitability ranking from the cognitive video API; and
using the audio unsuitability ranking and the video unsuitability ranking to generate the unsuitability ranking.

7. The method of claim 1 further comprising:
publishing the content data on a social media site in response to the unsuitability ranking being below the first predetermined threshold.

8. An information handling system comprising:
one or more processors;
a memory coupled to at least one of the processors;
a set of computer program instructions stored in the memory and executed by at least one of the processors in order to perform actions of:
receiving a request from a user to publish a set of content data;
prior to publishing the received set of content data:
generating an unsuitability ranking of the set of content data in response to evaluating a set of audio data and a set of video data included in the set of content data against a content knowledge base, wherein the evaluating further comprises: in response to determining that the set of audio corresponds to an acting scene, assigning a set of category similarity percentages to the set of audio data based on analyzing the set of audio data against a first set of emotion category audio;
in response to determining that the set of audio fails to correspond to the acting scene, assigning the set of category similarity percentages to the set of audio data based on analyzing the set of audio data against a second set of emotion category audio; and generating the unsuitability ranking based on the set of category similarity percentages;

in response to the unsuitability ranking exceeding a first predetermined threshold, prohibiting the publication of the set of content data; and in response to the unsuitability ranking being below a second predetermined threshold, publishing the set of content data.

9. The information handling system of claim 8 wherein the processors perform additional actions comprising:
storing the content data in an unpublished storage area in response to receiving the request from the user; and
performing the evaluating while the content data is stored in the unpublished storage area.

10. The information handling system of claim 8 wherein the processors perform additional actions comprising:
automatically publishing the content data in response to determining that the user belongs to an approved user list.

11. The information handling system of claim 8 wherein the processors perform additional actions comprising:
automatically prohibiting the publication of the content data in response to determining that the user belongs to a prohibited user list.

12. The information handling system of claim 8 wherein the processors perform additional actions comprising:
submitting the content data to an evaluator for review in response to determining that the unsuitability ranking is in a range between the first predetermined threshold and the second predetermined threshold.

13. The information handling system of claim 8 wherein the processors perform additional actions comprising:
sending the audio data to a cognitive audio API;
receiving an audio unsuitability ranking from the cognitive audio API;
sending the video data to a cognitive video API;
receiving a video unsuitability ranking from the cognitive video API; and
using the audio unsuitability ranking and the video unsuitability ranking to generate the unsuitability ranking.

14. The information handling system of claim 8 wherein the processors perform additional actions comprising:
publishing the content data on a social media site in response to the unsuitability ranking being below the first predetermined threshold.

15. A computer program product comprising a non-transitory computer readable storage medium having computer program code embodied therein that, when executed by an information handling system, causes the information handling system to perform actions comprising:
receiving a request from a user to publish a set of content data;
prior to publishing the received set of content data:
generating an unsuitability ranking of the set of content data in response to evaluating a set of audio data and a set of video data included in the set of content data against a content knowledge base, wherein the evaluating further comprises: in response to determining that the set of audio corresponds to an acting scene, assigning a set of category similarity percentages to the set of audio data based on analyzing the set of audio data against a first set of emotion category audio;

in response to determining that the set of audio fails to correspond to the acting scene, assigning the set of category similarity percentages to the set of audio data based on analyzing the set of audio data against a second set of emotion category audio; and generating the unsuitability ranking based on the set of category similarity percentages;

in response to the unsuitability ranking exceeding a first predetermined threshold, prohibiting the publication of the set of content data; and in response to the unsuitability ranking being below a second predetermined threshold, publishing the set of content data.

16. The computer program product of claim 15 wherein the information handling system performs further actions comprising:

storing the content data in an unpublished storage area in response to receiving the request from the user; and performing the evaluating while the content data is stored in the unpublished storage area.

17. The computer program product of claim 15 wherein the information handling system performs further actions comprising:

automatically publishing the content data in response to determining that the user belongs to an approved user list.

18. The computer program product of claim 15 wherein the information handling system performs further actions comprising:

automatically prohibiting the publication of the content data in response to determining that the user belongs to a prohibited user list.

19. The computer program product of claim 15 wherein the information handling system performs further actions comprising:

submitting the content data to an evaluator for review in response to determining that the unsuitability ranking is in a range between the first predetermined threshold and the second predetermined threshold.

20. The computer program product of claim 15 wherein the information handling system performs further actions comprising:

sending the audio data to a cognitive audio API;

receiving an audio unsuitability ranking from the cognitive audio API;

sending the video data to a cognitive video API;

receiving a video unsuitability ranking from the cognitive video API; and using the audio unsuitability ranking and the video unsuitability ranking to generate the unsuitability ranking.

* * * * *